Aug. 31, 1965  F. BRENDEL  3,203,661
SEAT SUPPORT
Filed July 13, 1962  3 Sheets-Sheet 1

INVENTOR:
FRIEDRICH BRENDEL

BY
Michael J. Striker
his ATTORNEY

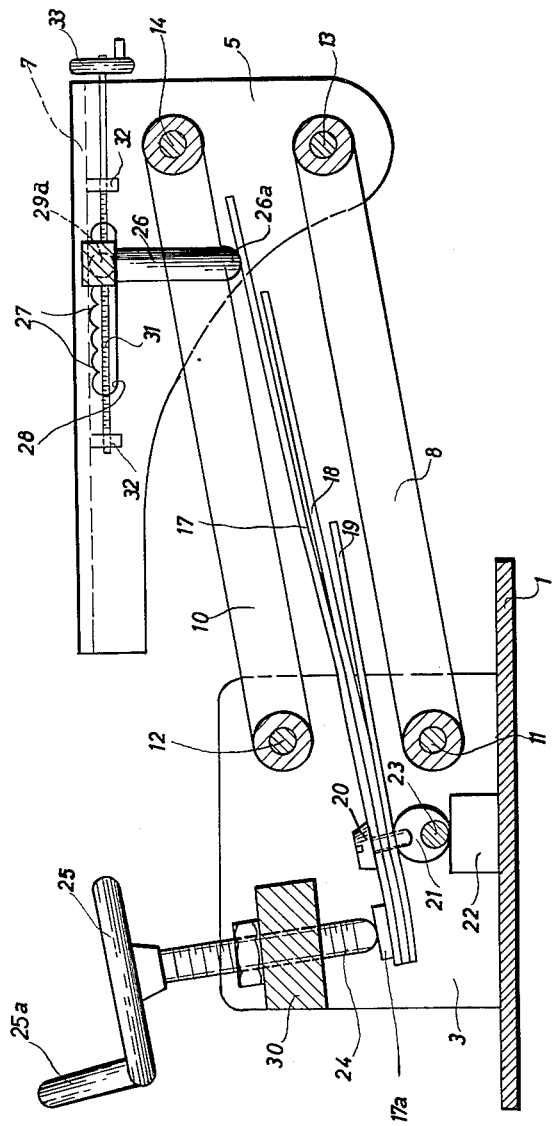

United States Patent Office 3,203,661
Patented Aug. 31, 1965

3,203,661
SEAT SUPPORT
Friedrich Brendel, Hauptstrasse, Saalstadt,
Pfalz, Germany
Filed July 13, 1962, Ser. No. 209,694
Claims priority, application Germany, Aug. 31, 1961,
B 63,850
13 Claims. (Cl. 248—399)

The present invention relates to seat supports in general, and more particularly to improvements in seat supports of the type which are especially suited for use in cabs of trucks, or tractors and in other types of automotive vehicles.

It is an important object of my invention to provide a very simple and comparatively inexpensive seat support for use in tractors and other types of automotive vehicles which must travel over uneven terrain.

Another object of the invention is to provide a seat support of small height so that it can be readily accommodated on smaller tractors or in the cab of a truck.

A further object of the invention is to provide a seat support of the above outlined characteristics wherein the load-transmitting frame which supports the seat or seat cushion is biased by one or more leaf springs and wherein the bias of such leaf springs may be varied by a person occupying the seat.

An additional object of my invention is to provide a seat support of the just outlined characteristics wherein the bias upon and/or the initial height of the seat may be adjusted in a very simple and convenient manner by a person occupying the seat mounted on the frame of the seat support.

A concomitant object of the instant invention is to provide a seat support wherein the weight of one or more persons occupying the seat is transmitted directly to one or more leaf springs and to the main supporting member of the seat support so that the guide means which is provided to articulately connect the main supporting member with the frame for the seat is subjected to negligible wear and tear.

Still another object of the invention is to provide a seat support of the above outlined characteristics wherein the springs are protected from excessive stresses and wherein the cushioning effect upon and the initial height of the seat may be adjusted merely by changing the effective length and the inclination of the springs.

An additional object of the invention is to provide a seat support wherein the load-transmitting frame which supports one or more seats or seat cushions is supportingly engaged by a package of two or more leaf springs and wherein the springs are arranged in such a way that one or more springs are not subjected to any stresses unless the load transmitted thereto by the frame reaches a predetermined magnitude so that the useful life of the springs is exceptionally long and that the bias of the package increases proportionally with increasing load.

A further object of the invention is to provide a seat support for tractors and the like whose components are readily accessible for the purposes of inspection, lubrication, replacement or repair, wherein the seat or seat cushion is automatically retained and biased in a selected uppermost position, and wherein the person or persons occupying the seat may readily adjust the initial bias upon the seat in such a way that they may find necessary comfort not only when the tractor is in motion but also when the tractor is at a standstill.

With the above objects in view, the invention resides in the provision of a seat support, particularly for use in trucks, tractors and other types of automotive vehicles, comprising a main supporting means or base, a load-transmitting frame adapted to support a seat or a seat cushion, resilient cushioning means including at least one leaf spring having a first portion secured to the base and a spaced second portion supportingly engaging the frame, a guide means for articulately connecting the base with the frame so that the frame is movable downwardly against and upwardly under the bias of the resilient means. The guide means preferably assumes the form of a parallel motion mechanism whose links are pivotally fixed to the base and to the frame, thus enabling the frame to move in parallelism with itself so that the inclination of the seat or seat cushion supported thereon need not change at all or changes only slightly when the frame is caused to vibrate while the vehicle travels on uneven terrain. It is preferred to provide a hydraulic or pneumatic shock absorber whose ends are operatively connected with the frame and with the base so that the shock absorber damps at least such vibrations which could cause damage to the resilient means and which could cause discomfort to the person or persons occupying the seat.

The novel features which are considered as characteristic of the invention are set forth in particular in the appended claims. The invention itself, however, both as to its construction and its method of operation, together with additional objects and advantages thereof, will be best understood from the following detailed description of a specific embodiment with reference to the accompanying drawings, in which:

FIG. 3 is a longitudinal section through the seat support as seen in the direction of arrows from the line III—III of FIG. 2.

Figure 1:
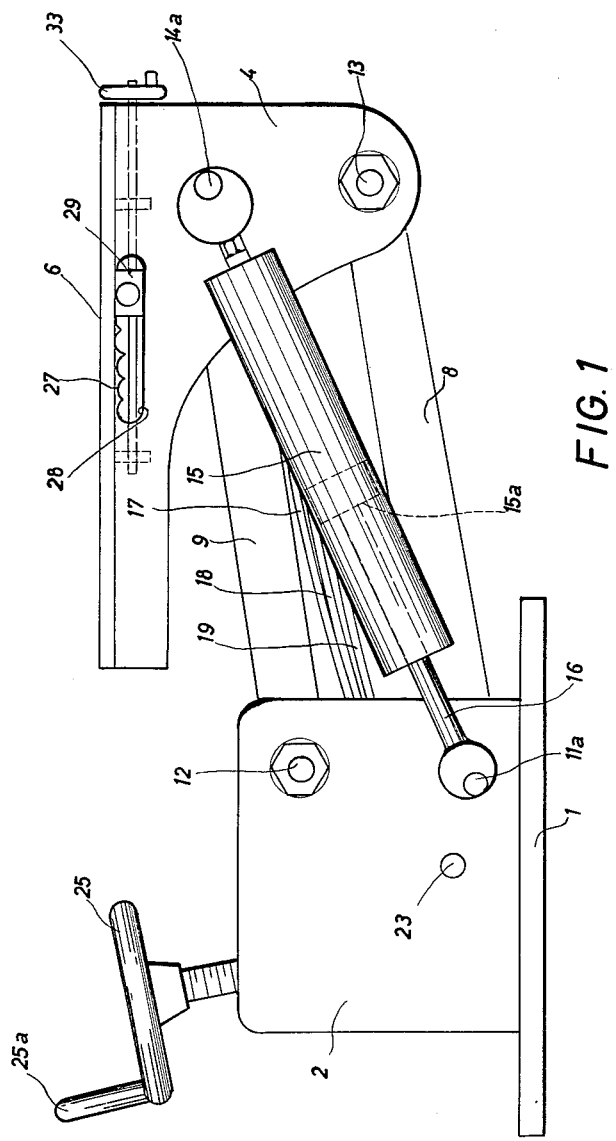
FIG. 1 is a side elevational view of a seat support which embodies my invention.

Referring now in greater detail to the drawings, there is shown a seat support which is assumed to form part of a seat construction for use in a tractor, in the cab of a truck or in another automotive vehicle. This seat support comprises a main supporting means or base 1 having a pair of upstanding side plates 2, 3 which are disposed in parallel vertical planes and which indirectly support a load-transmitting frame adapted to carry a seat or a seat cushion, not shown. The load-transmitting frame comprises a pair of inverted L-shaped carriers or bars 4, 5 which are laterally offset from and which are substantially coplanar with the side plates 2, 3, respectively. The carriers 4, 5 respectively comprise horizontal flanges 6, 7 which extend outwardly, i.e., in directions away from each other, and which are disposed in a common horizontal or nearly horizontal plane. The means for articulately connecting the frame 4, 5 with the side plates 2, 3 of the base 1 and for guiding the frame when the latter is caused to vibrate comprises a parallel motion mechanism including a lower profiled link 8 and a pair of upper profiled links 9, 10. The link 8 is U-shaped and is located midway between the links 9 and 10, and its ends are articulately connected to horizontal pivot members 11, 13 which are respectively mounted in the side plates 2, 3 and in the carriers 4, 5. As a rule, the pivot member 13 is located at a level somewhat above the pivot member 11. The left-hand ends of the upper links 9, 10 (as viewed in FIGS. 1 and 3) are articulately connected to a horizontal pivot member 12 which is mounted in the side plates 2, 3 and whose axis is located in a common vertical plane with the axis of the pivot member 11. The right-hand ends of the links 9, 10 are articulately secured to a fourth pivot member 14 which is mounted in the carriers 4, 5 and whose horizontal axis is coplanar with and is located above the axis of the pivot member 13. The arrangement is such that the flanges 6, 7 remain horizontal and move in parallelism with themselves when the links 8, 9 and 10 are caused to pivot about the members 11–14 either to permit upward movement of the frame 4, 5 or to permit this frame to descend in a direction toward the plane of the base 1.

The pivot members 11, 14 are provided with coaxial extensions 11a, 14a which are operatively connected with the cylinder and piston rod of a shock absorber 15, 16. In the illustrated embodiment, the cylinder 15 is connected with the pivot member 14 and the piston rod 16 is connected with the pivot member 11, but it will be readily understood that the mounting of the shock absorber may be reversed if desired or that two shock absorbers may be provided, one at the outer side of the side plate 2 (as actually shown in FIGS. 1 and 2) and the other at the outer side of the side plate 3. The device 15, 16 is assumed to constitute a hydraulic shock absorber and its purpose is to damp excessive vibrations of the frame 4, 5. It will be noted that the direction in which the shock absorber operates (the axis of the piston rod 16) is diagonal to the parallel motion mechanism.

Figure 2:
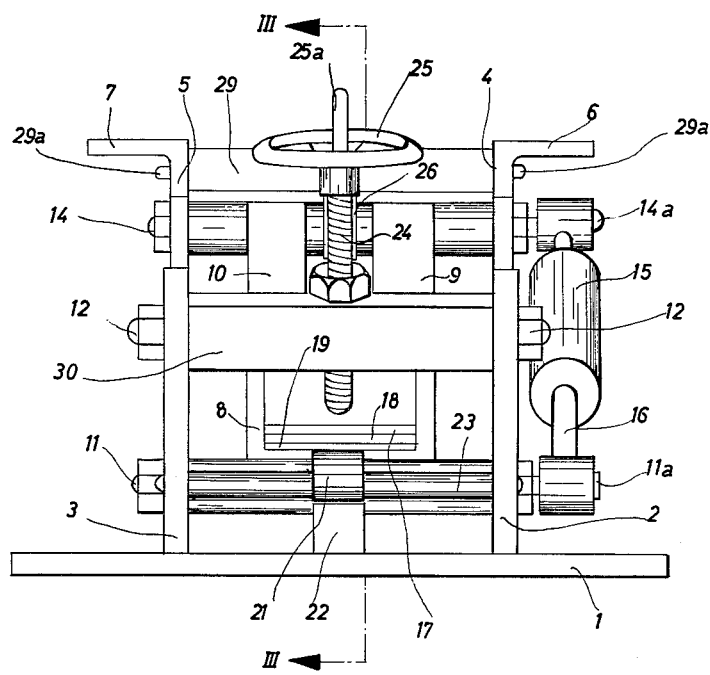
FIG. 2 is an end elevational view of the seat support as seen from the left-hand side of FIG. 1.

The means for resiliently holding the links 8–10 against clockwise pivotal movements, as viewed in FIGS. 1 and 3, and for supportingly engaging the load-transmitting frame 4, 5 comprises a package of overlapping leaf springs including an upper leaf spring 17, a somewhat shorter median spring 18, and a shortest lower spring 19. These springs are accommodated in the space between the parts 2, 4 and 3, 5 and are disposed in planes located above the central portion of the lower link 8. Each of springs 17–19 constitutes a two-armed lever whose longer arm extends toward the pivot members 13, 14 and whose shorter arm extends in the opposite direction. These springs are connected by a screw 20 which is located between the end portions of the package and which is driven into an eccentric cam 21 secured to a horizontal shaft 23 whose end portions are mounted in the side plates 2, 3. The cam 21 abuts against and cooperates with a stationary block 22 which is fixed to the base and which is located between the side plates 2, 3. The shaft 23 constitutes a fulcrum for the springs 17–19 and these springs may be rocked by the spherically configurated lower end of a spindle 24 which extends through a tapped bore provided in an internally threaded horizontal crosshead 30, the latter extending between the side plates 2, 3 and being located at a level above the shaft 23. The means for rotating the spindle 24 and for thereby changing the inclination of the package 17–19 comprises a handwheel 25 which is fixed to the upper end of the spindle and which is provided with a handle 25a so that a person occupying the seat supported by the flanges 6, 7 may rotate the spindle in the crosshead 30 to thereby rock the package 17–19 about the shaft 23 because the lower end of the spindle bears against a motion transmitting plate 17a provided at the left-hand end portion of the upper spring 17, as viewed in FIG. 3. The right-hand end portion of the upper spring 17 supportingly engages the lower end portion 26α of an adjustable motion-transmitting bolt 26 which serves as a means for adjusting the effective length of the package 17–19 and which is carried by a horizontal traverse 29 whose terminals 29a (see FIG. 2) extend outwardly through substantially horizontal slot-like apertures 28 provided in the carriers 4 and 5. Each of these terminals 29a may be accommodated in one of a plurality of notches 27 provided in the upper walls bounding the apertures 28 so that the bolt 26 is held against displacement in the longitudinal direction of the package 17–19. The parts 26, 29, the apertures 28 and the notches 27 together constitute a means for adjusting the effective length of the package 17–19 and for thereby adjusting the resiliency and bias of the leaf springs. For example, and referring to FIG. 3, it will be readily understood that the resiliency of the package 17–19 is reduced if the bolt 26 is moved in a direction to the left, i.e., nearer to the fulcrum 23, because the effective length of the longer arm of the package 17–19 is then reduced. On the other hand, the resiliency of this package may be increased by shifting the bolt 26 in a direction to the right, i.e., in a direction away from the fulcrum 23. The terminals 29a are within reach of a person occupying the seat supported by the flanges 6, 7 so that this person (for example, the driver of a tractor) may adjust the height of the frame 4, 5 by turning the handwheel 25 and that he may also adjust the resiliency of the package 17–19 without leaving his seat merely by moving the terminals 29a into another pair of aligned notches 27. Some changes in the height of the flanges 6, 7 will take place when the bolt 26 is shifted along the apertures 28 whenever the package 17–19 is inclined with respect to a horizontal plane. It is preferred to utilize a bolt whose lower end portion 26a is of spherical shape to insure that this bolt is not tilted when the frame 4, 5 vibrates and when the end portion 26a slides along the upper side of the spring 17 in response to such vibrations.

An important advantage of the improved seat support is that the pivot members 11–14 are subjected to very little wear because the weight of one or more persons occupying the seat or seats carried by the flanges 6, 7 of the frame 4, 5 is transmitted directly to the package 17–19 and thence to the base 1 so that the parallel motion mechanism 8–10 merely serves as a means for guiding the frame in vertical directions, without, however, taking up and without transmitting the weight of the frame and of the parts supported thereon. The weight is transmitted by the bolt 26, by the eccentric 23 and by the block 22, i.e., friction between the end portions of the links 8–10 and the pivot members 11–14 is minimal which is of considerable advantage because such friction could influence the cushioning effect of the package 17–19. Consequently, the package 17–19 responds immediately to minimal vibrations of the frame 4, 5 and cushions such vibrations to constitute a highly sensitive cushioning means for the seat. In other words, the package 17–19 is capable of cushioning such minimal vibrations which would be counteracted by friction between the links 8–10 and the pivot members 11–14 if the weight were transmitted through the links rather than through the package 17–19. The mounting of the frame 4, 5 may be compared with a very soft cushion which will yield to very small pressure in contrast to conventional seat supports of which I am aware at this time wherein small vibrations cannot take place because they are counteracted by frictional forces developing in the joints of articularly connected components of the seat support.

In accordance with a feature of my invention, the shock absorber 15, 16 is constructed and assembled in such a way that the piston 15a at the inner end of the rod 16 is received in the cylinder 15 with some initial play. Consequently, vibrations of small amplitude are not damped by the shock absorber but are counteracted solely by the package 17–19. For example, the play of the piston 15a in its cylinder 15 may be selected in such a way that the shock absorber will not damp vibrations whose amplitude is less than 10 mm. Such vibrations cannot detrimentally affect the package 17–19 and, since such vibrations are resisted only by one or more leaf springs, the seat supported by the frame 4, 5 is much more comfortable than a seat in which each and every (even smallest) vibration is counteracted by the full force of a hydraulic or pneumatic shock absorber.

If desired, the seat support of my invention may be provided with mechanical means for adjusting the position of the bolt 26 in the longitudinal direction of the package 17–19. Such mechanical means may assume the form of an externally threaded spindle 31 extending through a threaded bore provided in the traverse 29 and rotatably mounted in bearing brackets 32 welded to the frame 4, 5. This spindle is rotatable by a handwheel 33.

The bolt 26 can be considered to constitute a component part of the frame 4, 5, i.e., it can be said that the longer arm of the package 17-19 is in supporting engagement with the frame.

The basic characteristic of the package 17-19 is selected in such a way that this package produces an optimum cushioning effect for a given load. Such characteristic may be changed by utilizing materials of different elasticity, by utilizing leaf springs of different thickness, length and/or width, and/or by changing the effective length of the package in response to adjustments in the position of the bolt 26. Furthermore, and as shown in FIG. 3, the package 17-19 may be assembled in such a way that the frame 4, 5 normally rests on the uppermost spring 19 when the seat carried by this frame is not occupied or if it is occupied by a single person. For example, the arrangement may be such that the uppermost spring 17 is capable of supporting loads of up to say 100 lbs., that the median spring 18 becomes effective in that it is engaged by the spring 17 when the load increases to say 125 lbs., and that the lowermost spring 19 becomes effective when the load reaches or exceeds 150 lbs. When the seat carried by the frame 4, 5 is empty, the longer arms of the springs 17, 18, 19 are spaced from each other. Of course, the package may be replaced by a single leaf spring or it may comprise two, four or even more springs, all depending on the strength of the individual springs, on desired resiliency of the package and on the rated load which the package must transmit to the base.

It will be noted that the entire seat support is a structure of small height because the cushioning effect of the package 17-19 is equally satisfactory if its springs are disposed in substantially horizontal or nearly horizontal planes so that the flanges 6, 7 need not extend upwardly and beyond the level of the side plates 2, 3. The advantage of such construction will be readily understood if one considers that the improved seat support may be used in the cab of a truck or in a tractor where space is at a premium.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A seat support, particularly for use in automotive vehicles, comprising a base; a load-transmitting frame adapted to support a seat; guide means articulately connecting said frame with said base so that the frame is movable between an upper position and a lower position; resilient cushioning means comprising at least one elongated leaf spring having a first end portion supportingly engaging said frame and a second end portion adjacent to said base; fulcrum means mounted in said base and supportingly connected with said spring intermediate said end portions thereof so that the spring is rockable about said fulcrum means; first adjusting means provided on said base and engaging said second end portion for adjusting the inclination of said spring and for thereby adjusting the elevation of said frame, said frame being movable downwardly against and upwardly under the bias of said resilient means; and second adjusting means provided on said load transmitting frame, said second adjusting means having a portion engaging said first end portion of said spring and being adjustable in the longitudinal direction of said spring so as to change the effective length thereof and to thereby change the bias which said spring exerts on said load transmitting frame.

2. A seat support as set forth in claim 1, wherein said first adjusting means comprises a spindle having an end portion engaging the second end portion of said spring, an internally threaded member meshing with said spindle and fixed to said base, and means for rotating said spindle with respect to said internally threaded member so that the spindle increases the inclination of said spring and thereby lifts said frame when it is caused to rotate in one direction and that the spindle permits the frame to descend when it is rotated in the opposite direction.

3. A seat support, particularly for use in automotive vehicles, comprising a base; a load-transmitting frame adapted to support a seat; guide means comprising a parallel motion mechanism articulately connecting said frame with said base so that the frame is movable in substantial parallelism with itself between an upper position and a lower position; resilient cushioning means comprising at least one elongated leaf spring, said spring having a first end portion supportingly engaging said frame and a second portion adjacent to said base; fulcrum means mounted in said base and supportingly connected with said spring intermediate the end portions of said spring so that said spring is rockable about said fulcrum means; first adjusting means provided on said base and engaging the second end portion of said spring for adjusting the inclination of said spring and for thereby adjusting the elevation of said frame, said frame being movable downwardly against and upwardly under the bias of said spring; and second adjusting means provided on said load transmitting frame, said second adjusting means having a portion engaging said first end portion of said spring and being adjustable in the longitudinal direction of said spring so as to change the effective length thereof and to thereby change the bias which said spring exerts on said load transmitting frame.

4. A seat support, particularly for use in automotive vehicles, comprising a base; a load-transmitting frame adapted to support a seat; guide means comprising a parallel motion mechanism articulately connecting said frame with said base so that the frame is movable in substantial parallelism with itself between an upper position and a lower position each of which is laterally offset with respect to said base; resilient cushioning means comprising a package of at least two overlapping elongated leaf springs including a longer upper spring and at least one shorter lower spring, said upper spring having a first end portion supportingly engaging said frame and a second end portion adjacent to said base; fulcrum means mounted in said base and supportingly connected with said springs intermediate the end portions of said upper spring so that said springs are rockable about said fulcrum means; first adjusting means provided on said base and engaging the second end portion of said upper spring for adjusting the inclination of said package and for thereby adjusting the elevation of said frame, said frame being movable downwardly against and upwardly under the bias of said package; and second adjusting means provided on said load transmitting frame, said second adjusting means having a portion engaging said first end portion of said package and being adjustable in the longitudinal direction of said package so as to change the effective length thereof and to thereby change the bias which said package exerts on said load transmitting frame, each of said springs comprising a longer arm extending in a direction from said fulcrum means toward said frame and a shorter arm extending in a direction from said fulcrum means toward said first adjusting means.

5. A seat support as set forth in claim 4, wherein the longer arms of said springs are at least slightly spaced from each other when said frame assumes said upper position.

6. A seat support as set forth in claim 1, wherein said second adjusting means is a downwardly extending bolt which is adjustable with respect to said load-transmitting means in the longitudinal direction of said spring so as to reduce the effective length and to thereby increase the bias of said resilient means upon said load-transmitting means when adjusted in a direction toward said main supporting means, and to increase the effective length and to thereby reduce the bias of said resilient means when adjusted in the opposite direction.

7. A seat support as set forth in claim 6, further comprising manually operated means for adjusting said bolt in the longitudinal direction of said spring.

8. A seat support as set forth in claim 1, comprising shock absorber means operatively connected with said base and with said load-transmitting frame for damping excessive vibrations of said load-transmitting frame.

9. A seat support as set forth in claim 8, wherein said shock absorber means comprises a cylinder member and a piston member, one of said members being operatively connected with said load-transmitting frame and the other of said members being operatively connected with said base, and said piston member being received in said cylinder member with some initial play so that said shock absorber means does not damp comparatively small vibrations of said load-transmitting frame.

10. A seat support as set forth in claim 8, wherein said guide means comprises a parallel motion mechanism and wherein the direction in which said shock absorber means operates is substantially diagonal to said parallel motion mechanism.

11. A seat support as set forth in claim 1, wherein said portion of said second adjusting means which is in engagement with said spring comprises a spherical head.

12. A seat support as set forth in claim 1, wherein said guide means comprise a parallel motion mechanism including a pair of spaced upper links and a third link located between and at a level below said upper links, said spring being located above said third link and said second adjusting means having a portion extending downwardly between said upper links.

13. A seat support as set forth in claim 12, wherein said links consist of profiled stock and wherein said third link is U-shaped so that it is adapted to at least partially accommodate said resilient means.

References Cited by the Examiner

UNITED STATES PATENTS

| | | | |
|---|---|---|---|
| 1,416,942 | 5/22 | Brooks | 248—378 |
| 1,854,442 | 4/32 | Baird | 267—48 |
| 2,304,780 | 12/42 | De Fries | 267—45 |
| 2,360,428 | 10/44 | Larsen et al. | 248—387 |
| 2,550,074 | 4/51 | Marshall | 267—45 |
| 2,784,768 | 3/57 | Holopainen | 248—419 |
| 2,818,911 | 1/58 | Syak | 248—378 |
| 3,006,593 | 10/61 | Plate et al. | 248—376 |

CLAUDE A. LE ROY, *Primary Examiner.*

FRANK L. ABBOTT, *Examiner.*